United States Patent
Jacobs et al.

(10) Patent No.: US 10,369,620 B2
(45) Date of Patent: Aug. 6, 2019

(54) BEARING PIN UPSET METHOD TO RETAIN HIGH HARDNESS PINS

(71) Applicant: Eaton Corporation, Cleveland, OH (US)

(72) Inventors: Mark Edward Jacobs, Roxboro, NC (US); Joshua Gurganious, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 490 days.

(21) Appl. No.: 15/053,734

(22) Filed: Feb. 25, 2016

(65) Prior Publication Data

US 2016/0175919 A1  Jun. 23, 2016

Related U.S. Application Data

(63) Continuation of application No. PCT/US2014/051788, filed on Aug. 20, 2014.

(60) Provisional application No. 61/871,442, filed on Aug. 29, 2013, provisional application No. 62/029,745, filed on Jul. 28, 2014.

(51) Int. Cl.

| | |
|---|---|
| *B21K 25/00* | (2006.01) |
| *B21J 15/12* | (2006.01) |
| *F16C 35/06* | (2006.01) |
| *F16C 43/04* | (2006.01) |
| *F16C 19/46* | (2006.01) |
| *B21J 9/02* | (2006.01) |
| *F16C 35/063* | (2006.01) |

(52) U.S. Cl.
CPC ............... *B21J 9/025* (2013.01); *B21J 15/12* (2013.01); *B21K 25/00* (2013.01); *F16C 35/063* (2013.01); *F16C 43/04* (2013.01); *F16C 19/466* (2013.01); *Y10T 29/49915* (2015.01)

(58) Field of Classification Search
CPC ...... F16C 35/063; F16C 43/04; F16C 19/466; B21K 25/00; B21J 15/12; Y10T 29/49915
See application file for complete search history.

(56) References Cited

U.S. PATENT DOCUMENTS

| | | | |
|---|---|---|---|
| 3,866,452 A | 2/1975 | Neilsen | |
| 4,391,121 A * | 7/1983 | Taruntaev | B21J 15/12 173/52 |
| 5,099,807 A * | 3/1992 | Devine | F01L 1/14 123/90.48 |

(Continued)

FOREIGN PATENT DOCUMENTS

| | | |
|---|---|---|
| JP | 2007181864 A | 7/2007 |
| JP | 2010162562 A | 7/2010 |

OTHER PUBLICATIONS

International Search Report and Written Opinion for International Application No. PCT/US2014/051788 dated Nov. 17, 2014, 10 pages.

*Primary Examiner* — Bayan Salone
(74) *Attorney, Agent, or Firm* — RMCK Law Group PLC

(57) ABSTRACT

A method of upsetting an axle with a peen tool according to one example of the present disclosure includes contacting a distal end surface of the peen tool with a first terminal end of the axle. The distal end surface of the peen tool has a relief portion formed on the distal end surface that includes a concave profile. An area of the axle is displaced based on the contacting.

15 Claims, 6 Drawing Sheets

(56) References Cited

U.S. PATENT DOCUMENTS

| | | | | |
|---|---|---|---|---|
| 6,059,378 | A * | 5/2000 | Dougherty | B21K 25/00 |
| | | | | 301/124.1 |
| 7,010,845 | B2 * | 3/2006 | Muller | F16B 5/02 |
| | | | | 29/509 |
| 8,061,320 | B2 * | 11/2011 | Meisborn | F01L 1/146 |
| | | | | 123/90.48 |
| 9,243,521 | B2 * | 1/2016 | Cornett | F01L 1/14 |
| 2002/0157444 | A1 * | 10/2002 | Heussen | B21J 5/08 |
| | | | | 72/356 |
| 2005/0097722 | A1 * | 5/2005 | Muller | F16B 5/02 |
| | | | | 29/525.06 |
| 2010/0308612 | A1 * | 12/2010 | Antunes | B21J 5/08 |
| | | | | 295/36.1 |
| 2011/0005073 | A1 * | 1/2011 | Meisborn | F01L 1/14 |
| | | | | 29/888.03 |
| 2012/0152187 | A1 * | 6/2012 | Cornett | F01L 1/14 |
| | | | | 123/90.5 |
| 2015/0016854 | A1 * | 1/2015 | Endo | G03G 15/206 |
| | | | | 399/333 |
| 2016/0131193 | A1 * | 5/2016 | Oka | F02M 59/102 |
| | | | | 384/585 |

* cited by examiner

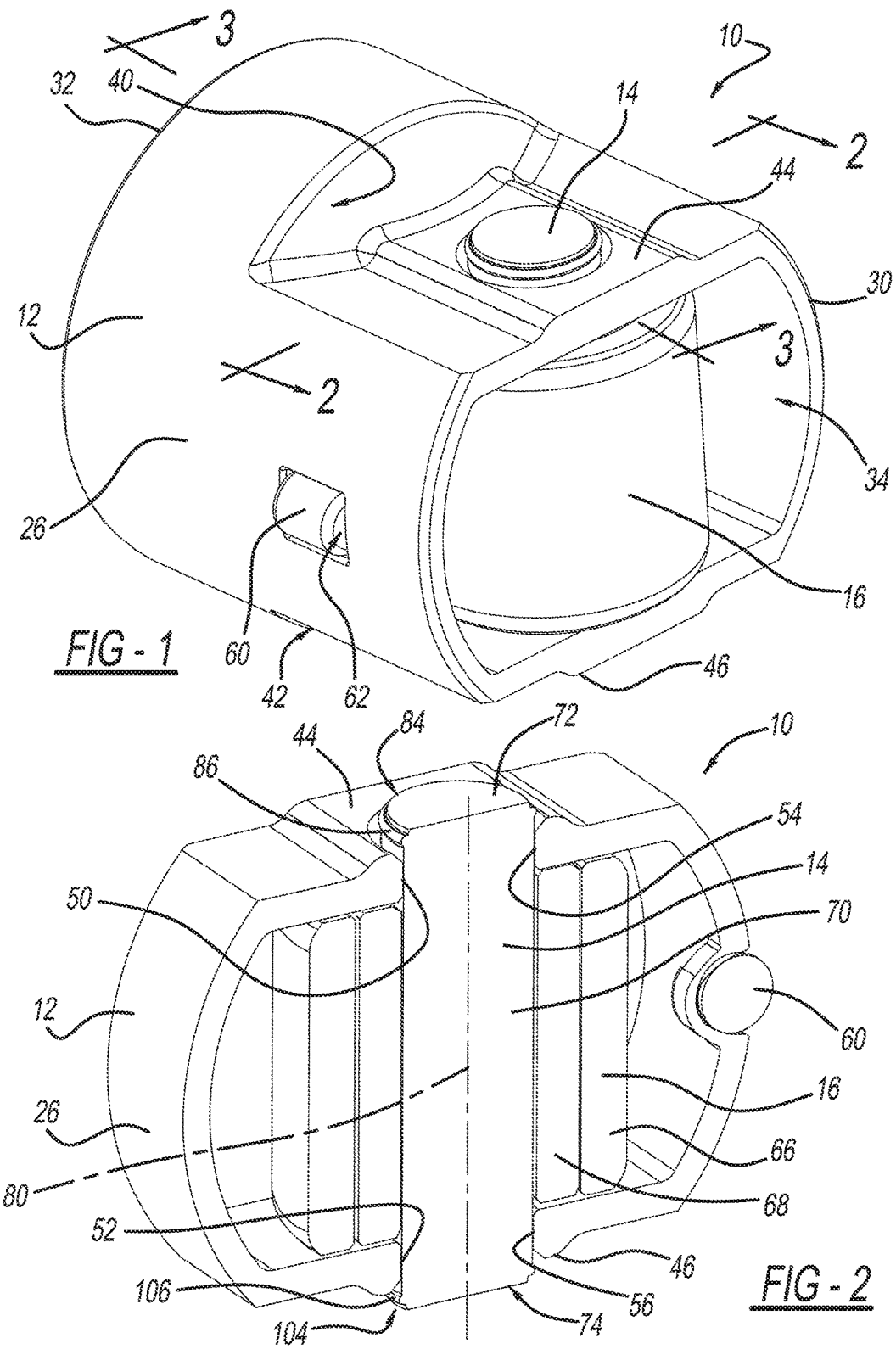

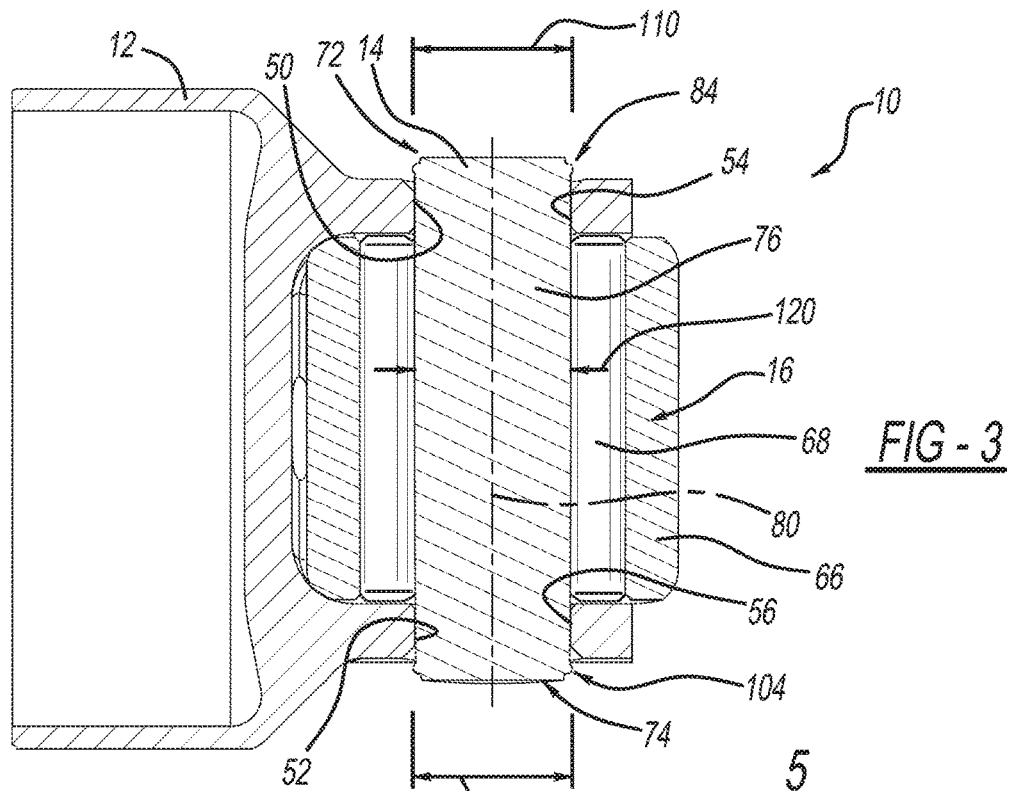
FIG-3
FIG-4
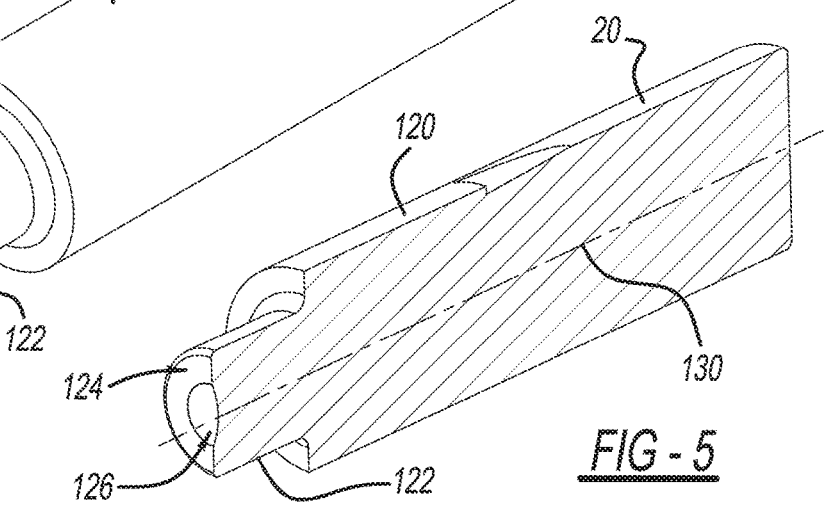
FIG-5

BEARING PIN UPSET METHOD TO RETAIN HIGH HARDNESS PINS

CROSS-REFERENCE TO RELATED APPLICATIONS

This application is a continuation of International Application No. PCT/US2014/051788 filed on Aug. 20, 2014, which claims the benefit of U.S. Patent Application No. 61/871,442 filed on Aug. 29, 2013 and U.S. Patent Application No. 62/029,745 filed on Jul. 28, 2014. The disclosures of the above applications are incorporated herein by reference.

FIELD

The present disclosure relates generally to a tool and related staking method for upsetting an axle or pin.

BACKGROUND

Tappets, such as fuel pump actuators, provide a mechanism to translate rotational motion of a rotating mechanism such as a cam into linear motion. In various configurations, tappets include a bearing, such as a needle bearing, fixed for rotation within an opening defined by a tappet body. Typically, such bearings are fixed for rotation by an axle or pin that extends on opposite ends through openings defined through the tappet body. These axles must be formed of a hard material that can withstand environmental conditions throughout the life of the tappet. In some configurations, the ends of the axles are upset to lock the axle relative to the tappet body at the openings. In some examples, high hardness upset methods currently available are not robust enough to avoid periodic loss of rotation freedom necessary to balance needle contact around the circumference of the pin.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of upsetting an axle with a peen tool according to one example of the present disclosure includes contacting a distal end surface of the peen tool with a first terminal end of the axle. The distal end surface of the peen tool has a relief portion formed on the distal end surface that includes a concave profile. An area of the axle is displaced based on the contacting.

According to additional features, the peen tool is oscillated around a radius of the axle at the first terminal end of the axle. The axle can be fixed in a first fixture wherein the first terminal end of the axle extends proud from the first fixture at a location for contact with the peen tool. The displacing can further comprise displacing material of the axle at the first terminal end resulting in a first deformation having a first bulbous end. The first bulbous end can have a first diameter. The axle can have an intermediate portion having an axle diameter. The first diameter can be greater than the axle diameter.

According to additional features, the method can include advancing a second terminal end of the axle through (i) a first axle hole defined in a tappet body, (ii) a bearing, and (iii) a second axle hole defined in the tappet body. The method can further include capturing the bearing for rotational movement around the axle in the tappet body. Subsequent to the capturing, the method can include contacting the distal end surface of the peen tool with the second terminal end of the axle thereby displacing the second terminal end of the axle. The displacing can further comprise displacing material of the axle at the second terminal end resulting in a second deformation having a second bulbous end. The second bulbous end can have a second diameter that is greater than the axle diameter.

A method of upsetting an axle with a peen tool according to another example of the present disclosure can include oscillating a distal end surface of the peen tool around a first radius of a first terminal end of the axle. The oscillating can cause a first deformation and a first bulbous axle end to be formed. A second terminal end of the axle can be advanced through (i) a first axle hole defined in a tappet body, (ii) a bearing, and (iii) a second axle hole defined in the tappet body. The distal end surface of the peen tool can be oscillated around a second radius of the second terminal end of the axle causing a second deformation and a second bulbous axle end to be formed. The bearing can be captured for rotational movement around the axle in the tappet body.

According to additional features, the method can further include contacting a distal end surface of the peen tool with the first terminal end of the axle. The distal end surface of the peen tool can have a relief portion formed on the distal end surface that includes a concave profile. According to other features, the axle can be fixed in a first fixture wherein the first terminal end of the axle extends proud from the first fixture at a location for contact with the peen tool.

According to other features, the first bulbous end can have a first diameter. The axle can have an intermediate portion having an axle diameter. The first diameter can be greater than the axle diameter. The second bulbous end can have a second diameter. The second diameter can be greater than the axle diameter. Subsequent to the formation of the first and second bulbous ends, the axle diameter can remain constant between the first and second axle holes.

A peen tool constructed in accordance to one example of the present disclosure can include a peen tool body having a main body including a distal tip. The distal tip can include a protruding tip surface that protrudes from an outer tip surface. The protruding tip surface can have a first diameter. The outer tip surface can have a second diameter. The first diameter can be less than the second diameter. The peen tool body can have a bulbous portion at the distal tip. The peen tool can be arranged at a substantially six degree orientation relative to a longitudinal axis of an axle during a peening operation.

BRIEF DESCRIPTION OF THE DRAWINGS

The present disclosure will become more fully understood from the detailed description and the accompanying drawings, wherein:

FIG. 1 is perspective view of a pump actuator tappet having an axle that is constructed in accordance to one example of the present teachings and upset according to one method of the present disclosure;

FIG. 2 is a first cross-sectional view of the pump actuator tappet taken along lines 2-2 of FIG. 1;

FIG. 3 is a second cross-sectional view of the pump actuator tappet taken along lines 3-3 of FIG. 1;

FIG. 4 is a front perspective view of a peen tool constructed in accordance to one example of the present disclosure;

FIG. 5 is a cross-sectional view of the peen tool taken along lines 5-5 of FIG. 4;

DETAILED DESCRIPTION

Figure 6:
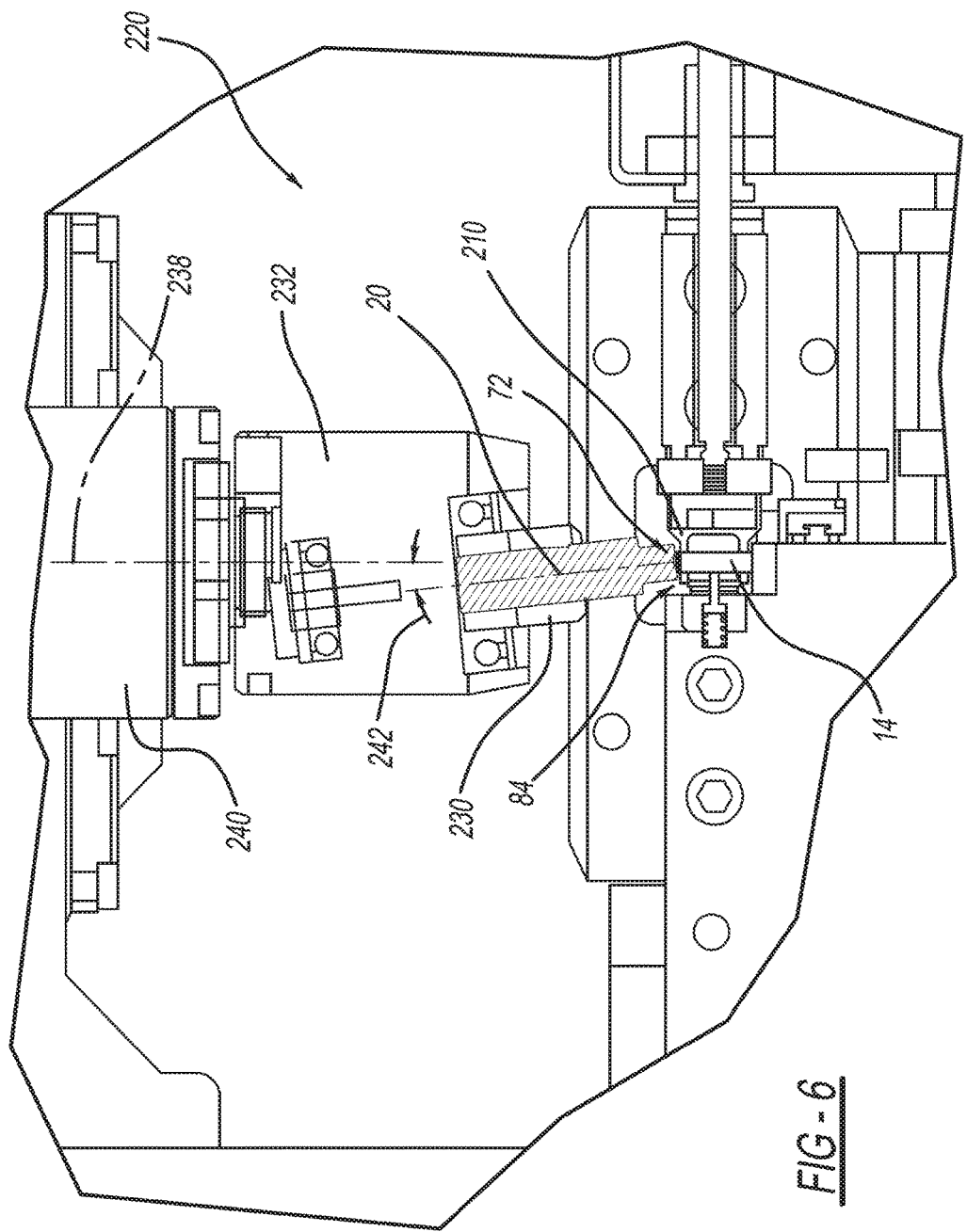
FIG. 6 is a front view of an exemplary peening station used to deform a first terminal end of the axle sufficiently to create the first bulbous axle end.

With initial reference to FIGS. 1-3, a pump actuator tappet constructed in accordance to one example of the present disclosure is shown and generally identified at reference numeral 10. The pump actuator tappet 10 can generally include a tappet body 12, an axle 14, and a bearing 16. In general, the pump actuator tappet 10 can provide a mechanism to translate rotational motion of a rotating mechanism such as a cam into linear motion. As will become appreciated from the following discussion, the present teachings provide a method of upsetting the axle 14 with a peen tool 20 (FIG. 4) such that the bearing 16 remains captured in the tappet body 12.

The pump actuator tappet 10 will now be described in greater detail. The tappet body 12 can generally include a cylindrical outer surface 26 that generally extends from a first end 30 to a second end 32. An opening 34 of the tappet body 12 can be defined at the first end 30. The cylindrical outer surface 26 can further include a pair of inset portions 40 and 42. The inset portions 40 and 42 can further include a first ear 44 and a second ear 46. The tappet body 12 can further include a first axle receiving wall 50 and a second axle receiving wall 52. The first axle receiving wall 50 can define a first axle hole 54. The second axle receiving wall 52 can define a second axle hole 56. An alignment member or anti-rotation pin 60 can be press fit into a recess 62 defined in the tappet body 12. In one example, the alignment member 60 can be a cylindrical pin that can extend outwardly from the cylindrical outer surface 26. The bearing 16 can collectively include a roller 66 and a plurality of roller bearings 68 on which the roller 66 can be mounted to the axle 14.

The axle 14 will now be described in greater detail. The axle 14 generally comprises an axle body 70 that extends from a first terminal end 72 to a second terminal end 74. The axle body 70 further includes an intermediate portion 76 (FIG. 3) positioned generally between the first and second terminal ends 72 and 74. The axle body 70 extends along a longitudinal axle axis 80.

According to the teachings of the present disclosure, the first terminal end 72 of the axle 14 includes a first deformation 84 having a first bulbous axle end 86. The second terminal end 74 includes a second deformation 104 having a second bulbous axle end 106. The first bulbous axle end 86 can have a first diameter 110. The second bulbous axle end 106 can have a second bulbous diameter 112. The intermediate axle portion can have an axle diameter 120. In one example, the first and second diameters 110 and 112 are greater than the axle diameter 120. Notably, the axle diameter 120 remains constant throughout the length of the axle body 70 of the axle 14 between the first and second bulbous axle ends 86 and 106. In this regard, the configuration of the axle 14 provides a consistent outer diameter that interfaces with the bearing 16 to inhibit tilting of the bearing 16 relative to the longitudinal axle axis 80. Explained further, the diameter of the axle 14 is constant inboard of the first and second axle receiving walls 50 and 52.

With reference now to FIGS. 4 and 5, the peen tool 20 will now be described in greater detail. According to the present disclosure, the peen tool 20 is used to stake the axle 14 relative to the tappet body 12. The peen tool 20 generally includes a main peen tool body 120 that includes a distal tip 122. The distal tip 122 includes a distal end surface 124 having a relief portion 126 defined at a centerline 130 of the main peen body 120. The relief portion 126 can generally include a concave profile. As will become appreciated from the following discussion, during use, the distal end surface 124 of the peen tool 20 can engage the first and second terminal ends 72 and 74 of the axle 14 creating the respective first and second deformations 84 and 104.

Advantageously, the relief portion 126 allows contact of the peen tool 20 closer to a perimeter of the axle 14. The first and second deformations 84 and 104 cause respective areas of displacement generally around a radius of the axle 14 at the first and second terminal ends 72 and 74. The areas of the displacement result in the generally bulbous cross-sectional profile of the first and second bulbous axle ends 86 and 106. In this regard, the peen tool 20 and method according to the present teachings reduces the total amount of material displaced to achieve retention of the axle 14 within the body 12. This creates greater displacement radially resulting in higher retention force and less deformation axially which improves alignment of the bearing 16 within the tappet body 12. Moreover, reduced cycle time and load is required over prior art methods to create the respective deformations 84 and 104.

With particular reference now to FIG. 6, a method of upsetting the axle 14 with the peen tool 20 according to one example of the present disclosure will be described. At the outset, the axle 14 can be fixed by a first fixture 210 at a first peen station 220. It will be appreciated that the configuration of the first peen station 220 is merely exemplary. In this regard, the first peen station 220 may be constructed in many different configurations without departing from the scope of the present disclosure.

In the example shown, the axle 14 is fixed in a generally proud orientation having the first terminal end 72 positioned in an upright orientation ready for engagement with the peen tool 20. The peen tool 20 is mounted in a fixed orientation to a peen chuck 230 that is fixed to an oscillating body 232. The oscillating body 232 is configured for rotation around an axis 238. The oscillating body 232 is caused to rotate from an electric motor 240. Notably, the peen tool 20 is mounted to the oscillating body 232 at an angle 242 relative to the axis 238. In one example the angle 242 can be 6 degrees plus/minus 0.5 degrees. Other angles are contemplated. In the first peen station 220, the oscillating body 232 is caused to rotate around the axis 238 while engaging the first terminal end 72 of the axle 14. Oscillating engagement of the peen tool 20 around the first terminal end 72 causes the first deformation 84 and ultimately the first bulbous axle end 86 to be formed (see also FIGS. 2 and 3).

Figure 7:
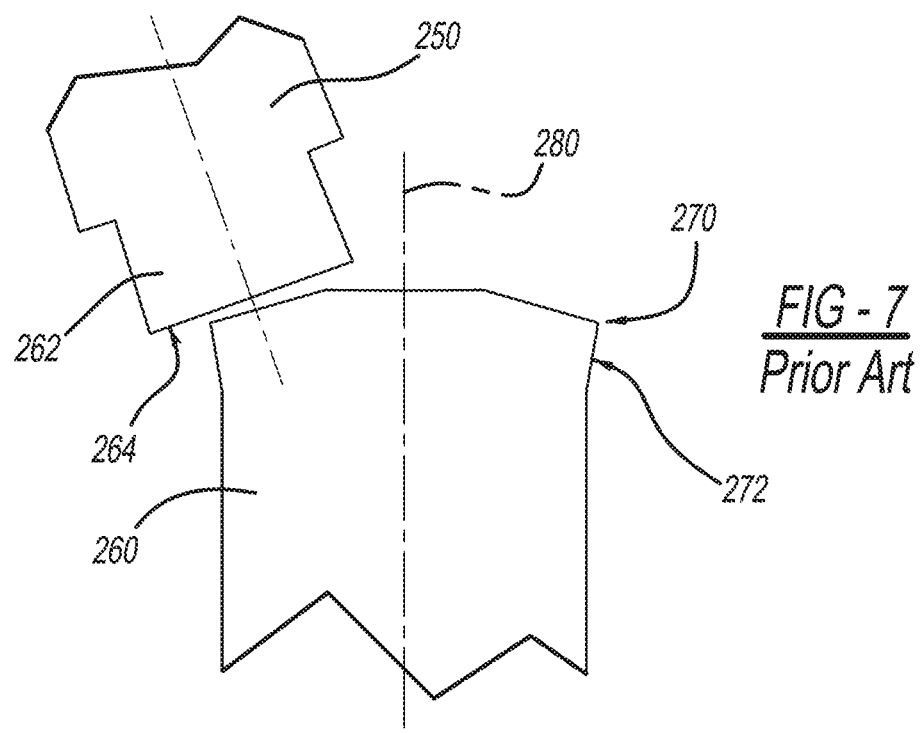
FIG. 7 is a sectional view of a tool and related staking method according to prior art.
Figure 8:
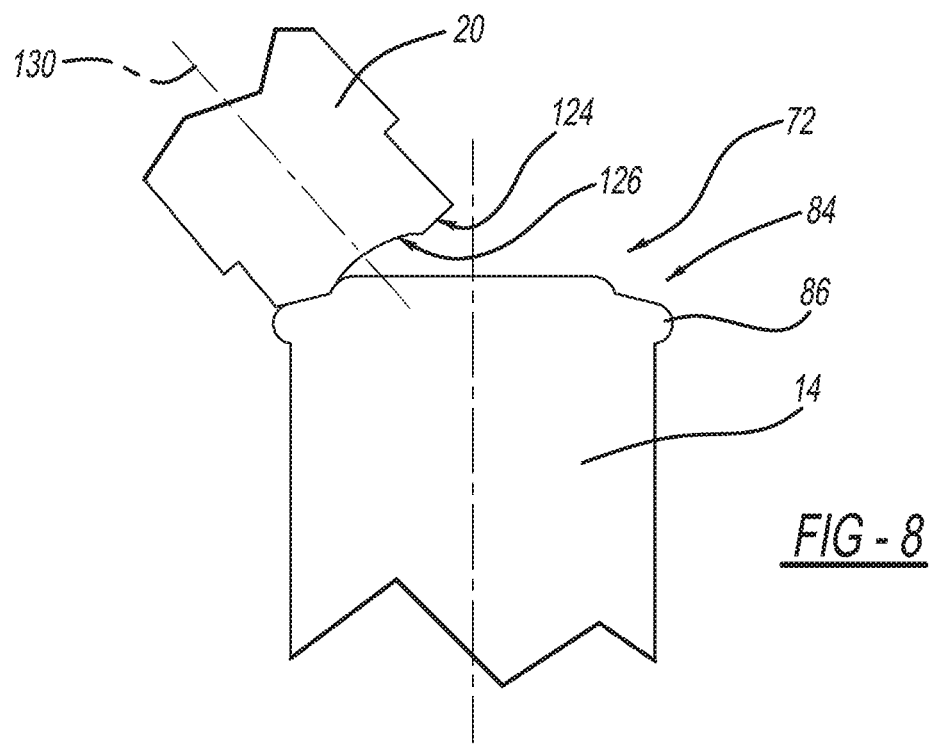
FIG. 8 is a sectional view of a tool and staking method according to one example of the present disclosure.

A brief comparison of the peen tool 20 and resulting axle 14 with one example of prior art will now be described. In one prior art method shown in FIG. 7, a peen tool 250 is shown deflecting a terminal end of an axle 260. In this prior art method shown, the peen tool 250 has a distal tip 262 that provides a generally planar engaging portion 264. The planar engaging portion 264 can cause a terminal end 270 of the axle 260 to deflect and present a generally tapered outer surface 272. In some arrangements however, the tapered surface 272 can present drawbacks. In one drawback, the tapered surface 272 can interface with an inner diameter of the bearing causing the bearing to undesirably tilt relative to an axle axis 280 in an assembled position. Additionally, the configuration shown in the prior art example of FIG. 7 requires increased load requirements.

Returning now to the peen station 220 in FIG. 6, once the first terminal end 72 of the axle 14 has been deformed sufficiently to create the first bulbous axle end 86, the axle 14 can be assembled relative to the tappet body 12 and bearing 16. Specifically, the second terminal end 74 of the axle 14 (undeformed end) can be advanced through the first axle hole 54 of the tappet body 12, through the bearing 16 and out the second axle hole 56. Such a sequence may be accomplished through another automated station for example. In other examples, the second terminal end 74 (side corresponding to second ear 46) of the axle 14 is peened first and the first terminal end 72 of the axle 14 is peened second.

Figure 9:
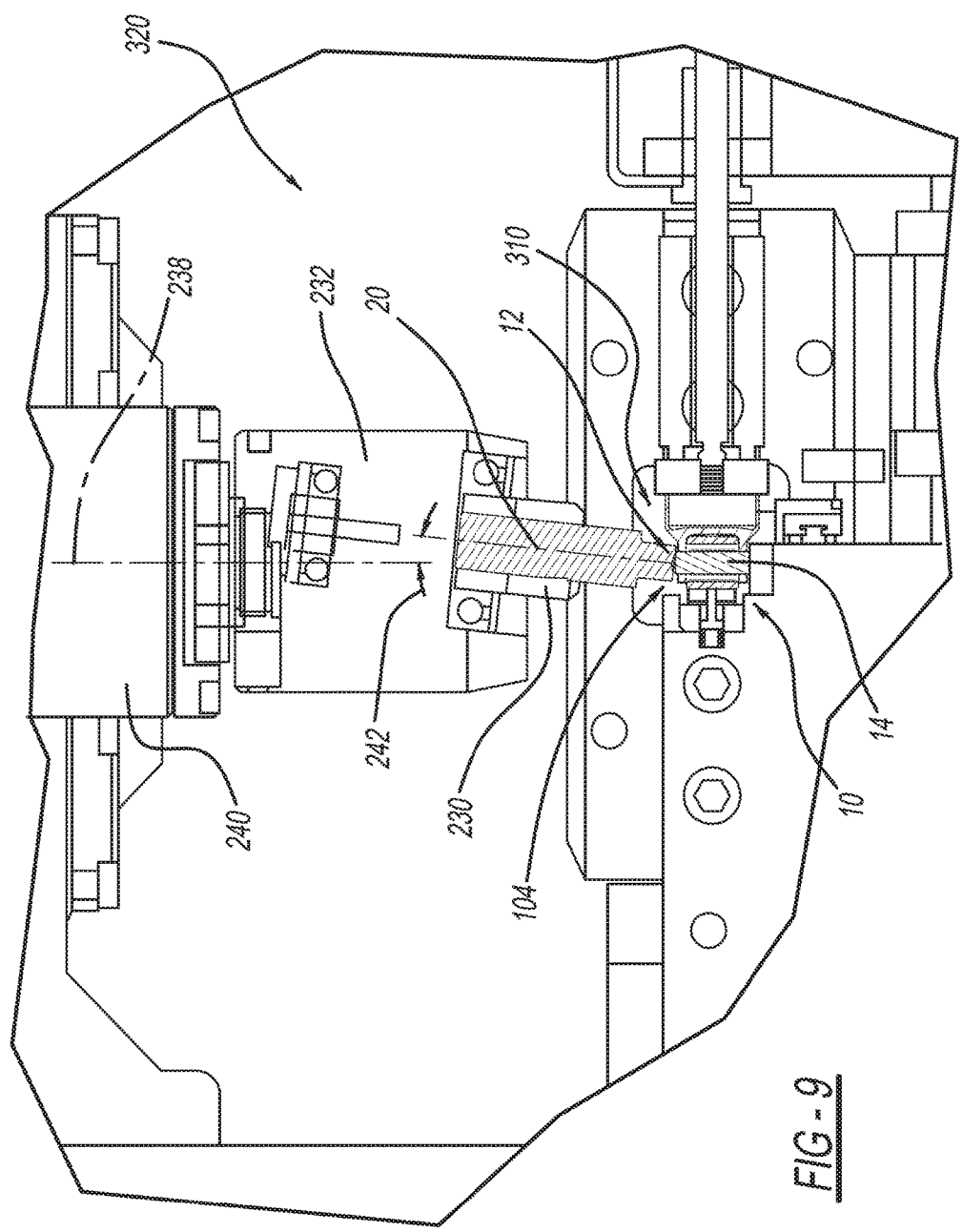
FIG. 9 is a front view of an exemplary peening station used to deform a second terminal end of the axle sufficiently to create a second bulbous axle end and lock the bearing for rotational movement relative to the tappet body.

The pump actuator tappet 10 can then be fixed by a fixture 310 at a second peen station 320 shown in FIG. 9. It will be appreciated that the configuration of the second peen station 320 is merely exemplary. In this regard, the second peen station 320 may be constructed in many different configurations without departing from the scope of the present disclosure. Once the pump actuator tappet 10 is fixed in a static position relative to the fixture 310 at the second peen station 320, the second terminal end 74 of the axle 14 is deformed. Specifically, the peen tool 20 is caused to rotate around the second terminal end 74 of the axle 14 creating the second deformation 104 and ultimately formation of the second bulbous axle end 106. Once the second bulbous axle end 106 has been sufficiently formed, the axle 14 is staked or longitudinally fixed relative to the tappet body 12 between the first and second bulbous axle ends 86 and 106. Specifically, the axle 14 may be permitted to move axially along the longitudinal axle axis 80 until contact of either the first bulbous axle end 86 with the first axle receiving wall 50 or the second bulbous axle end 106 with the second axle receiving wall 52.

Figure 10:
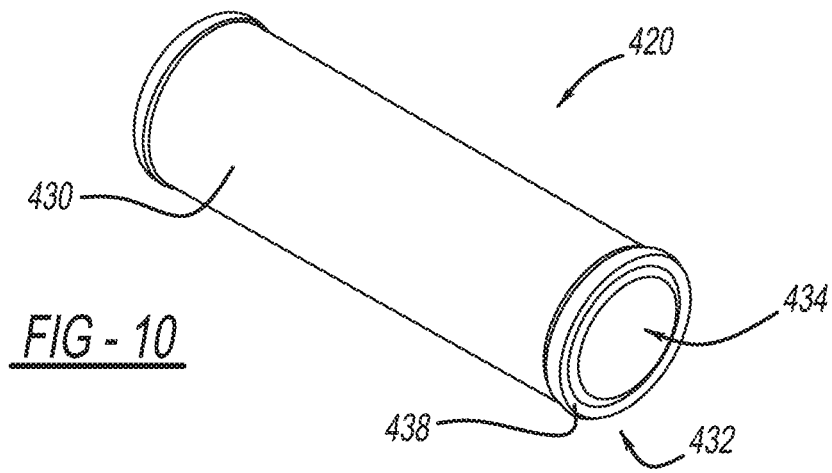
FIG. 10 is a perspective view of a peen tool constructed in accordance to additional features of the present disclosure.
Figure 11:
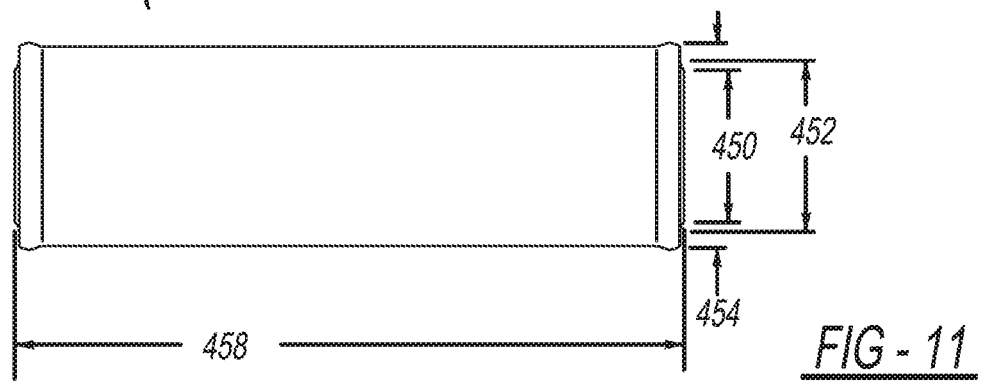
FIG. 11 is a side view of the peen tool of FIG. 10.
Figure 12:
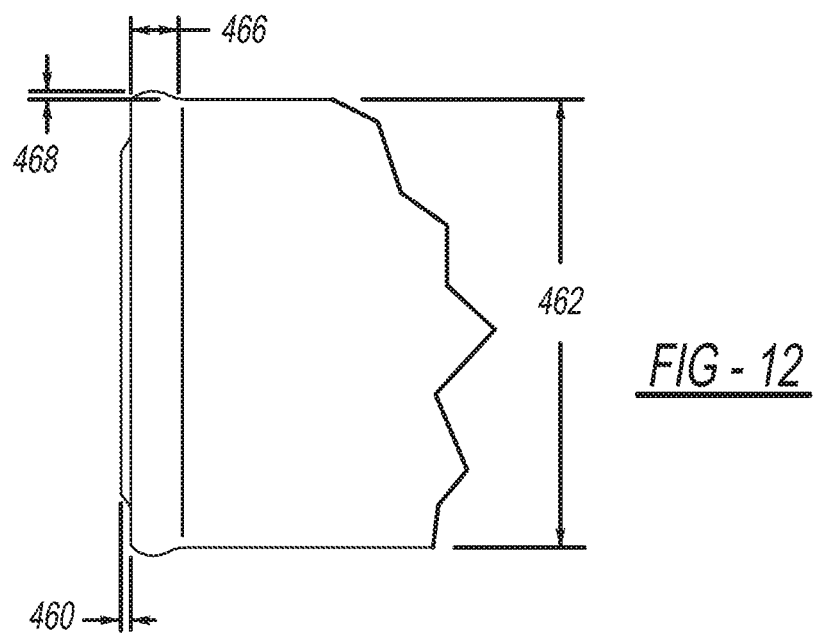
FIG. 12 is an enlarged partial side view of the peen tool of FIG. 10.

With reference now to FIGS. 10-12, a peen tool 420 constructed in accordance to additional features will now be described in greater detail. According to the present disclosure, the peen tool 420 is used to stake the axle 14 relative to the tappet body 12. The peen tool 420 generally includes a main peen tool body 430 that includes a distal tip 432. The distal tip 432 includes a protruding tip surface 434 and an outer tip surface 438. During use, the distal tip 432 of the peen tool 420 can engage the first and second terminal ends 72 and 74 of the axle 14, as described above, creating the respective first and second deformations 84 and 104. Exemplary, non-limiting dimensions, listed in inches, for the peen tool 420 will now be identified. The protruding tip surface 434 can have a diameter of 0.220 to 0.240. A transition 452 from the outer tip surface 438 to the protruding tip surface 434 can have a diameter of 0.242 to 0.270. The peen tool 420 can have a length of 0.996. The protruding tip surface 434 can protrude from the outer tip surface 438 between 0.011 to 0.004. A diameter 462 of the peen tool 420 can be 0.298. A bulbous end of the peen tool 420 can have an axial length 466 of between 0.040 to 0.020 and a radial outset of 0.011 and 0.003. Other dimensions are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of upsetting an axle with a peen tool, the method comprising:
   oscillating a distal end surface of the peen tool around a first radius of a first terminal end of the axle causing a first deformation and a first bulbous axle end to be formed;
   subsequent to forming the first bulbous axle end, advancing a second terminal end of the axle through (i) a first axle hole defined in a tapped body, (ii) a bearing, and (iii) a second axle hole defined in the tappet body; and
   oscillating the distal end surface of the peen tool around a second radius of the second terminal end of the axle causing a second deformation and a second bulbous axle end to be formed; and
   capturing the bearing for rotational movement around the axle in the tappet body.

2. The method of claim 1 wherein oscillating the distal end surface of the peen tool around the first radius comprises:
   contacting a distal end surface of the peen tool with the first terminal end of the axle, the distal end surface of the peen tool having a relief portion formed on the distal end surface that includes a concave profile.

3. The method of claim 1, further comprising:
   fixing the axle in a first fixture wherein the first terminal end of the axle extends proud from the first fixture at a location for contact with the peen tool.

4. The method of claim 1 wherein the first bulbous end has a first diameter and wherein the axle has an intermediate portion having an axle diameter, wherein the first diameter is greater than the axle diameter.

5. The method of claim 4 wherein the second bulbous end has a second diameter, wherein the second diameter is greater than the axle diameter.

6. The method of claim 5 wherein subsequent to the formation of the first and second bulbous ends, the axle diameter remains constant between the first and second axle holes.

7. The method of claim 1, further comprising forming the first and second bulbous axle ends such that the axle has a constant diameter within the first and second axle holes defined by the respective first and second receiving walls.

8. The method of claim 1, further comprising forming the first and second bulbous axle ends such that the axle has a constant diameter inboard of the first and second axle receiving walls.

9. The method of claim 1, further comprising forming the first and second bulbous axle ends such that the axle has a constant diameter between the first and second bulbous axle ends.

10. The method of claim 1, further comprising forming the first and second bulbous axle ends such that the axle has a constant diameter between the first and second bulbous axle ends and a constant diameter within the first and second axle holes.

11. The method of claim 1, wherein the tappet body includes first and second inset portions having respective first and second ears, the first ear including the first axle hole, and the second ear including the second axle hole, further comprising forming the first and second bulbous axle ends such that the first and second bulbous axle ends are disposed outboard of the respective first and second axle holes and outboard of an outermost surface of the respective first and second ears.

12. The method of claim 1, further comprising:
fixing the axle in a first fixture wherein the first terminal end of the axle extends proud from the first fixture at a location for contact with the peen tool.

13. The method of claim 1, wherein the first bulbous end has a first diameter and wherein the axle has an intermediate portion having an axle diameter, wherein the first diameter is greater than the axle diameter.

14. The method of claim 13 wherein the second bulbous end has a second diameter that is greater than the axle diameter.

15. A method of upsetting an axle with a peen tool, the method comprising:
contacting a distal end surface of the peen tool with a first terminal end of the axle causing a first deformation and a first bulbous axle end to be formed;
subsequently advancing a second terminal end of the axle through (i) a first axle hole defined by a first receiving wall of a tappet body, (ii) a bearing, and (iii) a second axle hole defined by a second receiving wall of the tappet body; and
subsequently contacting the distal end surface of the peen tool with a second terminal end of the axle causing a second deformation and a second bulbous axle end to be formed,
wherein the distal end surface of the peen tool includes a relief portion having a concave profile,
wherein the first and second bulbous axle ends are each disposed outboard of an outer surface of the tappet body defining the first and second axle holes,
wherein the axle has an intermediate portion extending from the first bulbous axle end to the second bulbous axle end,
wherein the intermediate portion has a constant diameter.

* * * * *